(12) United States Patent
Tanaka

(10) Patent No.: US 11,149,657 B2
(45) Date of Patent: Oct. 19, 2021

(54) THROTTLE DEVICE

(71) Applicant: MIKUNI CORPORATION, Tokyo (JP)

(72) Inventor: Isamu Tanaka, Odawara (JP)

(73) Assignee: MIKUNI CORPORATION, Tokyo (JP)

( * ) Notice: Subject to any disclaimer, the term of this patent is extended or adjusted under 35 U.S.C. 154(b) by 0 days.

(21) Appl. No.: 16/951,151

(22) Filed: Nov. 18, 2020

(65) Prior Publication Data

US 2021/0172387 A1 Jun. 10, 2021

(30) Foreign Application Priority Data

Dec. 4, 2019 (JP) .............................. JP2019-219688
Dec. 4, 2019 (JP) .............................. JP2019-219689
Dec. 4, 2019 (JP) .............................. JP2019-219690

(51) Int. Cl.
| | |
|---|---|
| *F02D 9/10* | (2006.01) |
| *F02D 13/06* | (2006.01) |
| *F02D 17/02* | (2006.01) |
| *F02D 11/10* | (2006.01) |
| *F02D 41/00* | (2006.01) |

(52) U.S. Cl.
CPC ............. *F02D 9/1065* (2013.01); *F02D 9/10* (2013.01); *F02D 11/10* (2013.01); *F02D 13/06* (2013.01); *F02D 17/02* (2013.01); *F02D 41/0002* (2013.01); *F02D 41/008* (2013.01); *F02D 41/0087* (2013.01); *F02D 9/105* (2013.01); *F02D 2011/101* (2013.01); *F02D 2041/0012* (2013.01)

(58) Field of Classification Search
CPC ........ F02D 9/1605; F02D 9/105; F02D 11/10; F02D 13/06; F02D 17/02; F02D 41/0002; F02D 41/008; F02D 41/0087
USPC .......................................................... 123/336
See application file for complete search history.

(56) References Cited

U.S. PATENT DOCUMENTS

| | | | |
|---|---|---|---|
| 7,066,142 B2* | 6/2006 | Hanasato .............. | F02D 9/1095 123/336 |
| 2005/0133004 A1* | 6/2005 | Maehara .............. | F02D 9/1065 123/336 |

(Continued)

FOREIGN PATENT DOCUMENTS

| | | | | |
|---|---|---|---|---|
| EP | 1548252 | | 6/2005 | |
| JP | 2005-282463 A | | 10/2005 | |
| JP | 2006077587 A | * | 3/2006 | ............... F02D 9/02 |

OTHER PUBLICATIONS

Extended European Search Report, dated Apr. 21, 2021, in corresponding European Application No. 20211205.8 (9 pp.).

*Primary Examiner* — Mahmoud Gimie

(57) ABSTRACT

Provided is a throttle device including a total of two throttle units in two cylinders in an engine, each of the throttle units having a throttle shaft, throttle valves, and a motor driving and rotating the throttle shaft, in which a return spring provided in a first throttle unit and a return spring provided in a second throttle unit out of the two throttle units are components of the same type and have mutually different installation forms in the throttle units such that biasing torques at the same degree of opening of the throttle valves differ from each other, thereby enabling performances of responding to a change in rotation speed to be different from each other.

21 Claims, 15 Drawing Sheets

(56) References Cited

U.S. PATENT DOCUMENTS

| | | | |
|---|---|---|---|
| 2006/0011168 A1* | 1/2006 | Hanasato | F02D 9/1065 |
| | | | 123/399 |
| 2006/0042589 A1* | 3/2006 | Hanasato | F02D 11/10 |
| | | | 123/336 |
| 2006/0236971 A1 | 10/2006 | Kanda et al. | |
| 2007/0039586 A1 | 2/2007 | Maehara et al. | |
| 2008/0230034 A1 | 9/2008 | Dunn | |
| 2016/0160763 A1* | 6/2016 | Matsuda | B62K 11/00 |
| | | | 123/403 |

* cited by examiner

THROTTLE DEVICE

CROSS-REFERENCE TO RELATED APPLICATIONS

This Application claims priority from Japanese Patent Application No. 2019-219688 filed on Dec. 4, 2019, Japanese Patent Application No. 2019-219689 filed on Dec. 4, 2019, and Japanese Patent Application No. 2019-219690 filed on Dec. 4, 2019, which are incorporated herein by reference in their entirety.

BACKGROUND OF THE INVENTION

Field of the Invention

The present invention relates to a throttle device controlling intake air of an engine.

Description of the Related Art

Many of engines mounted on vehicles such as motorcycles for driving the vehicles to travel have a plurality of cylinders to obtain high outputs. Further, multi-throttle devices that provide throttle valves for each of the plurality of cylinders have widely been employed in motorcycles to improve engine outputs.

For example, Japanese Patent Laid-Open No. 2005-2822463 discloses an inline four-cylinder engine provided with a throttle valve in each of intake air passages of cylinders. The engine disclosed in the aforementioned document includes a motor to drive a throttle valve for a first cylinder and a throttle valve for a second cylinder, a motor to drive a throttle valve for a third cylinder, and a motor to drive a throttle valve for a fourth cylinder. This enables degrees of opening of the first cylinder, the second cylinder, the third cylinder, and the fourth cylinder to be individually controlled by controlling driving of each motor. Further, the engine disclosed in the aforementioned document includes a cylinder deactivated operation function of deactivating operations of a part (the third cylinder and the fourth cylinder) of the plurality of cylinders.

According to such an engine provided with throttle valves for each of cylinders and provided with a plurality of motors for driving the throttle valves as described above, cases in which degrees of opening of the throttle valves significantly differ from each other may occur due to the individual control of the driving of the motors. According to such an engine provided with the cylinder deactivated operation function as in the aforementioned document, throttle valves of the part of cylinders that are deactivated are set to have predetermined degrees of opening (in a closed state, for example) at the time of the cylinder deactivated operation, and the degree of opening of the throttle valves of the cylinders that are deactivated and of the cylinders that are not deactivated at the time of the cylinder deactivated operation may thus significantly differ from each other, for example.

There is a possibility that when it is attempted to control all the throttle valves to have the same target degree of opening, for example, from such a state in which the degrees of opening of the throttle valves significantly differ from each other in this manner, the difference in degree of opening of the throttle valves is not immediately solved at the time of shifting to the target degree of opening and a driver of the vehicle have an uncomfortable feeling due to a difference in outputs of the cylinders caused by the difference in degree of opening of the throttle valves.

SUMMARY OF THE INVENTION

An object of the present invention, which has made in view of such circumstances, is to provide a multi-throttle valve device that is employed in multi-cylinder engine and is capable of curbing an uncomfortable feeling due to a difference in outputs of the cylinders.

In order to achieve the aforementioned object, a throttle device according to the present invention includes: a plurality of throttle units provided in an engine for each of cylinders or for each of cylinder groups, each of the throttle units including a throttle body having intake air passages corresponding to the plurality of cylinders of the engine, a throttle shaft rotatably supported by the throttle body, throttle valves secured to the throttle shaft to open and close the intake air passages of the cylinders, a motor driving and rotating the throttle shaft, and a biasing portion biasing the throttle shaft to cause the throttle valves to have a first predetermined degree of opening, in which a biasing torque of the biasing portion provided in a first throttle unit and a biasing torque of the biasing portion provided in a second throttle unit out of the plurality of throttle units are different from each other at a same degree of opening of the throttle valves.

According to the throttle device of the present invention, it is possible to set the opening/closing speeds of the throttle valve of the first throttle unit and of the throttle valve of the second throttle unit to be different from each other and thereby to immediately solve a difference in degree of opening of the throttle valves in a case in which the motors are driven to have the same predetermined degree of opening from a state in which the degrees of opening of the throttle valves are different from each other. It is thus possible to quickly solve a difference between an output of the cylinder, intake air of which is controlled by the first throttle unit, and an output of the cylinder, intake air of which is controlled by the second throttle unit, to obtain a smooth engine output, and to curb an uncomfortable feeling of a driver.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

Hereinafter, an embodiment of the present invention will be described on the basis of drawings.

Figure 1:
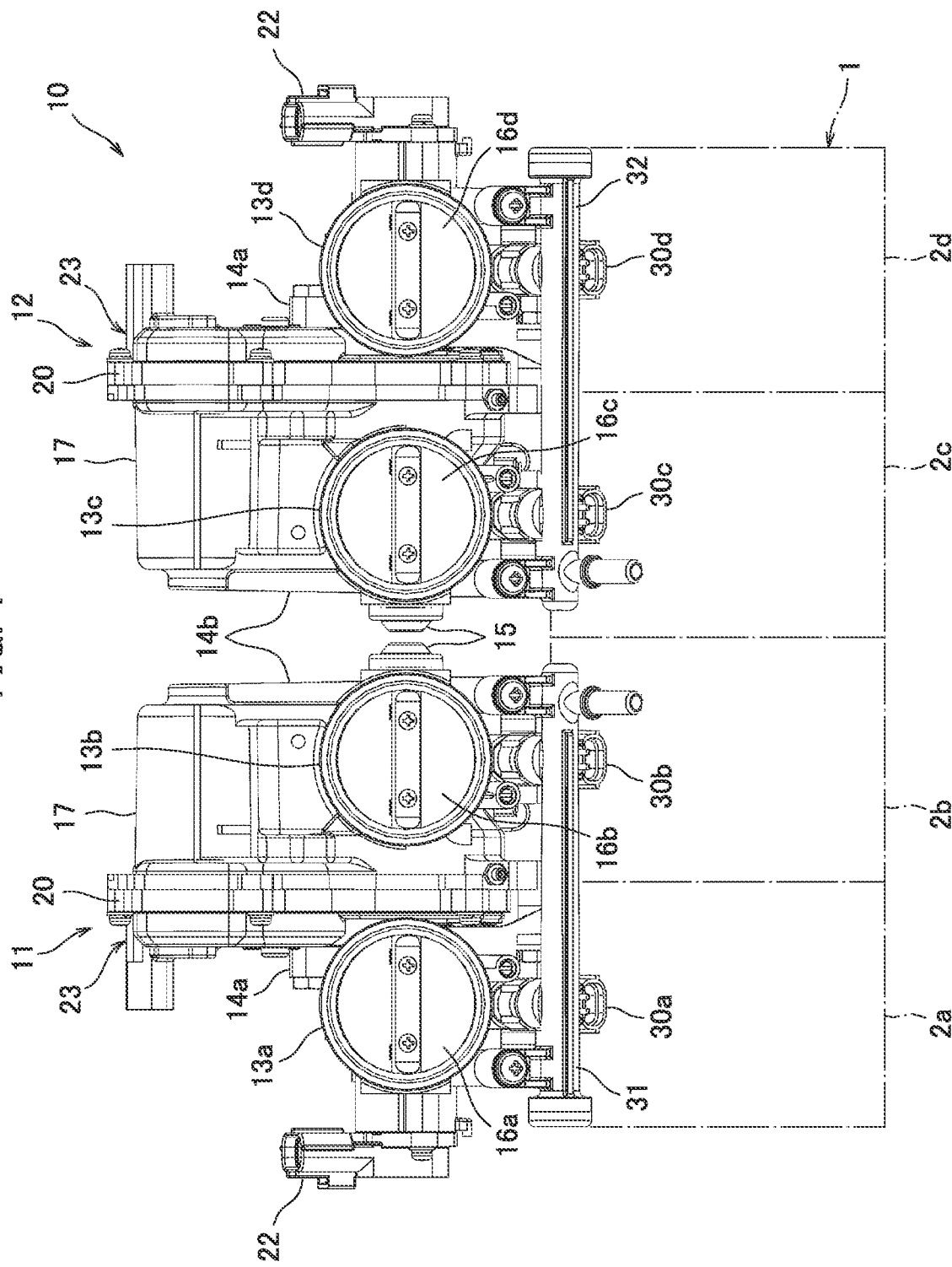
FIG. 1 is an external view of a throttle device according to an embodiment of the present invention.
Figure 2:
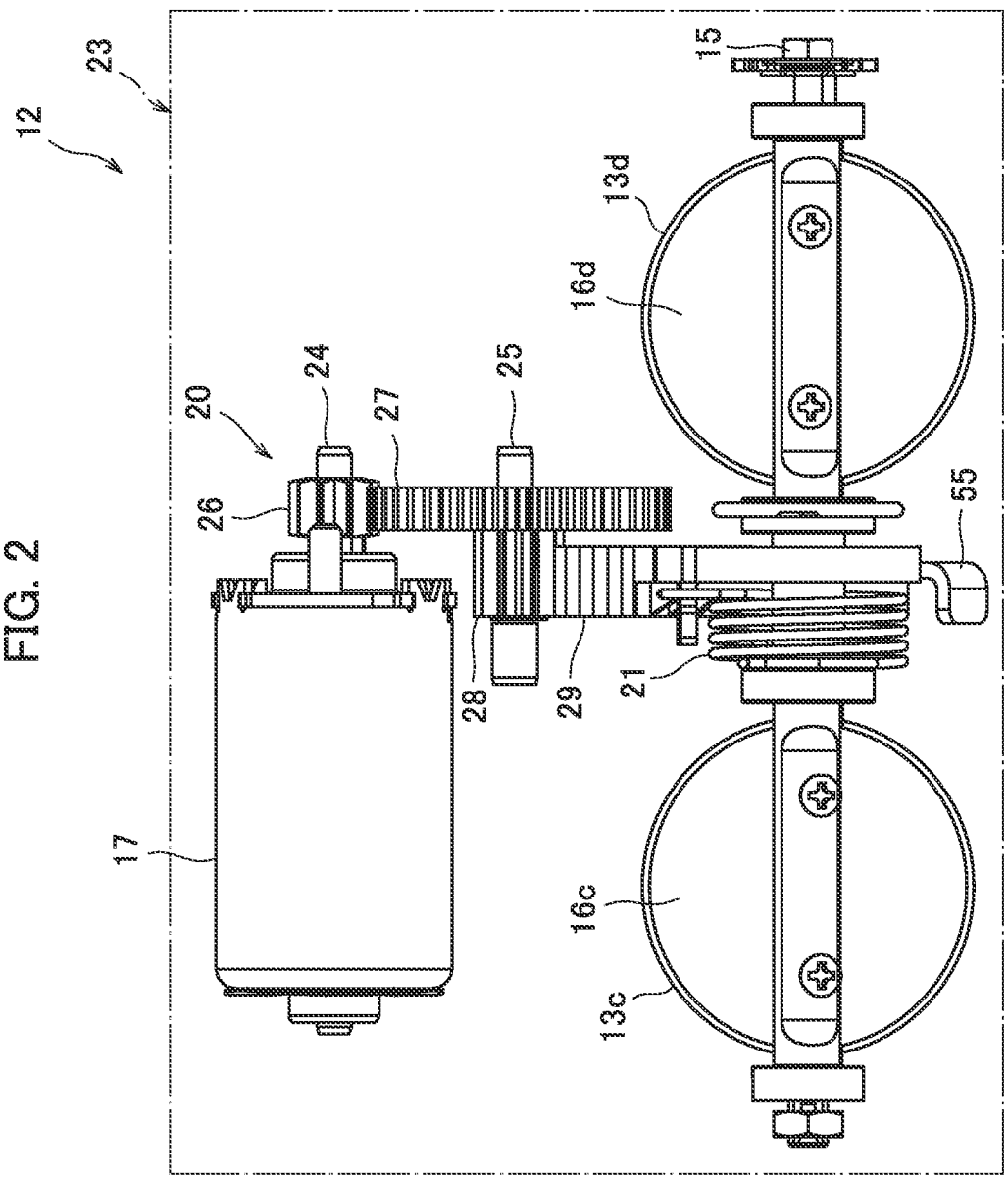
FIG. 2 is an overview configuration diagram of a throttle unit.
Figure 3:
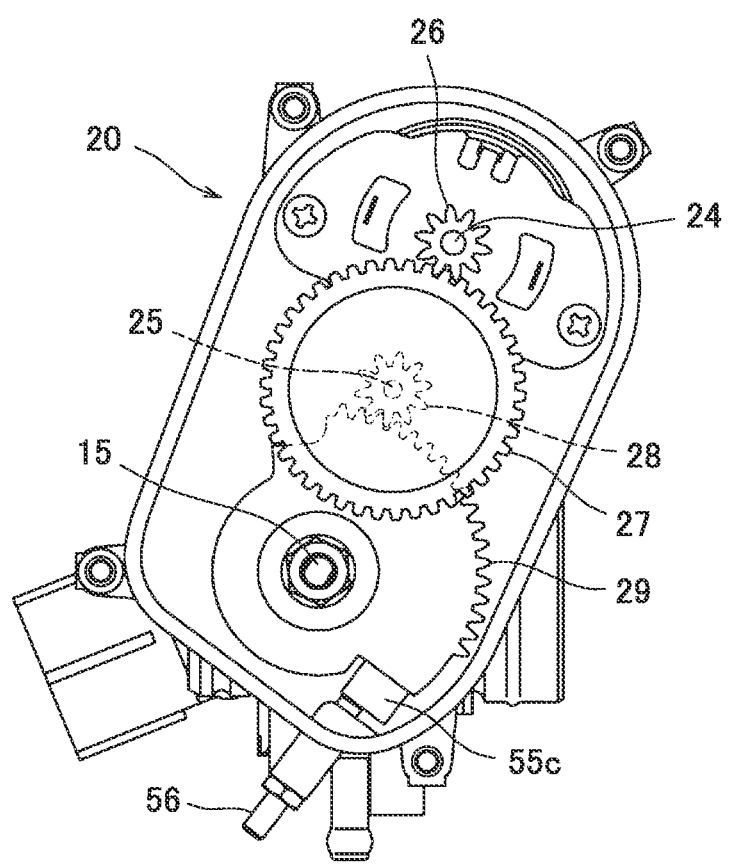
FIG. 3 is an internal structure diagram of a deceleration mechanism.
Figure 4:
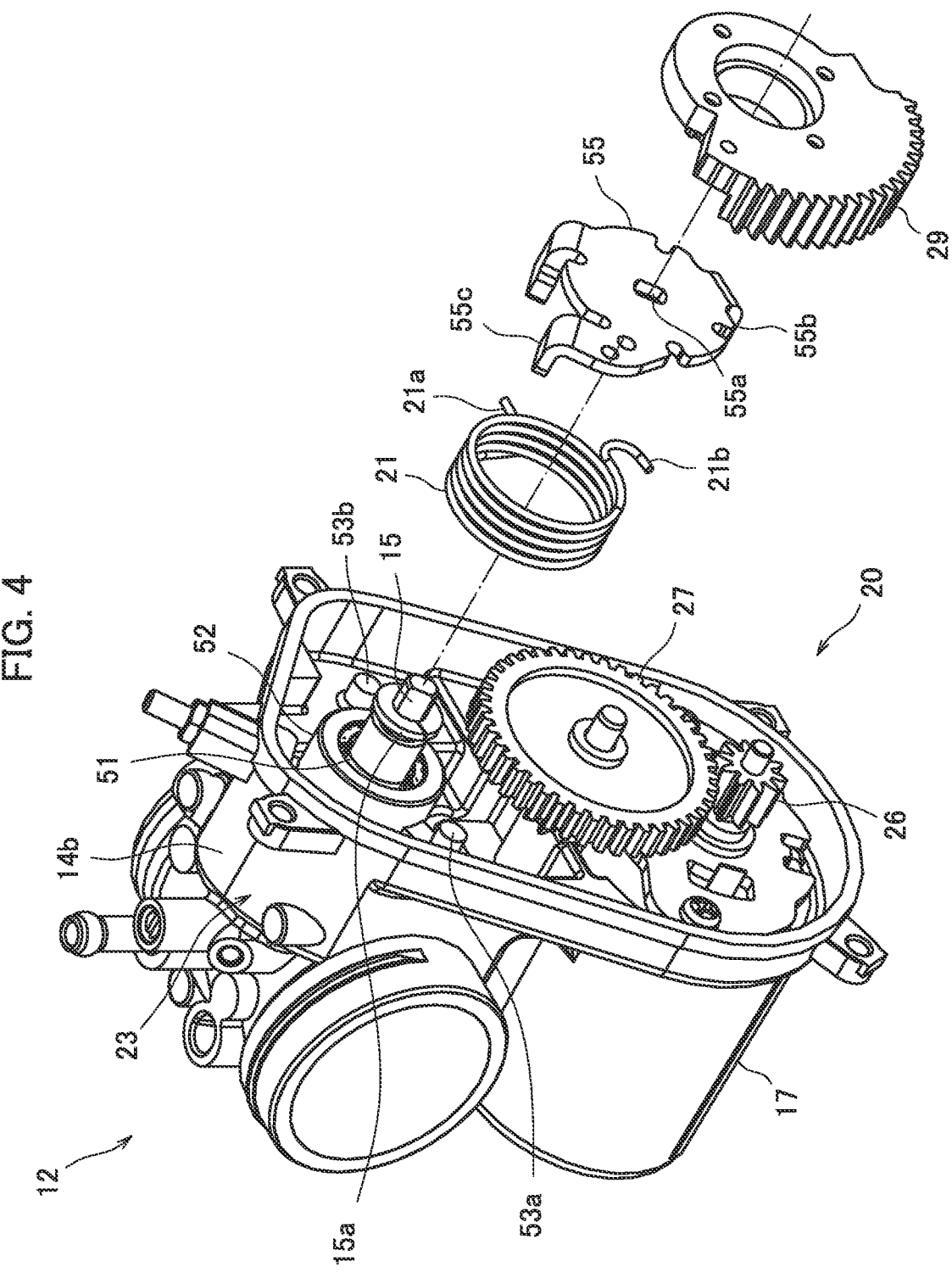
FIG. 4 is an assembly diagram of an attachment portion of a return spring according to a first embodiment.

FIG. 1 is an external view of a throttle device 10 according to an embodiment of the present invention. FIG. 2 is an overview configuration diagram of a throttle unit (second throttle unit 12). FIG. 3 is an internal structure diagram of a deceleration mechanism 20 (decelerator). FIG. 4 is a structure diagram of an attachment portion of a return spring.

The throttle device 10 according to the present invention is a multi-throttle device attached to a multi-cylinder engine. The throttle device 10 according to this embodiment is employed in an inline four-cylinder engine 1 mounted on a vehicle such as a motorcycle. For the engine 1, four cylinders (2a, 2b, 2c, and 2d) from #1 to #4 are disposed to be aligned in a vehicle width direction (left-right direction) in the vehicle.

As illustrated in FIG. 1, the throttle device 10 has a first throttle unit 11 (throttle unit) for a cylinder group (a #1 cylinder 2a and a #2 cylinder 2b) disposed on one side of the engine 1 in the vehicle width direction and a second throttle unit 12 (throttle unit) for a cylinder group (a #3 cylinder 2c and a #4 cylinder 2d) disposed on the other side of the engine 1 in the vehicle width direction. The first throttle unit 11 and the second throttle unit 12 are disposed to be aligned on the left and right sides in the vehicle width direction.

The first throttle unit 11 and the second throttle unit 12 are configured to be symmetric on the left and right sides.

The first throttle unit 11 includes a first segment body 14a in which an intake air passage 13a of the #1 cylinder 2a is formed and a second segment body 14b in which an intake air passage 13b of the #2 cylinder 2b is formed.

The second throttle unit 12 includes a second segment body 14b in which an intake air passage 13c of the #3 cylinder 2c is formed and a first segment body 14a in which an intake air passage 13d of the #4 cylinder 2d is formed.

As illustrated in FIGS. 1 and 2, each of the first throttle unit 11 and the second throttle unit 12 further includes a throttle shaft 15, throttle valves 16b to 16d, a motor 17, a deceleration mechanism 20, a return spring 21 (biasing portion), and a throttle position sensor 22. Note that FIG. 2 illustrates the internal structure of the second throttle unit 12 and the intake air passage 13c is provided with the throttle valve 16c while the intake air passage 13d is provided with the throttle valve 16d. In the first throttle unit 11, the intake air passage 13a is provided with the throttle valve 16a while the intake air passage 13b is provided with the throttle valve 16b.

The first segment body 14a and the second segment body 14b are disposed to be aligned in the left-right direction (vehicle width direction) in accordance with the corresponding cylinders 2a to 2d to form a unit body 23 (throttle body).

The intake air passages 13a to 13d are formed to extend perpendicularly (in the front-back direction in FIGS. 1 and 2) to the left-right direction. The throttle shaft 15 extends in the vehicle width direction through the unit body 23, passes through the inside of the two intake air passages (13a and 13c or 13c and 13d), and is rotatably supported by the unit body 23.

The throttle valves 16a to 16d are disk-shaped members that have substantially the same diameter as the inner diameter of the intake air passages 13a to 13d, are secured to the throttle shaft 15, and are disposed inside the intake air passages 13a to 13d. The throttle valves 16a to 16d rotate inside the intake air passages 13a to 13d along with rotation of the throttle shaft 15 and can rotate at an arbitrary angle between a closed position at which the intake air passages 13a to 13d are closed and an opened position at which the intake air passages 13a to 13d are opened.

The motor 17 is an electric motor. The motor 17 is secured to the second segment body 14b in each of the throttle units 11 and 12 and is disposed such that a rotation drive axis 24 is parallel to the throttle shaft 15.

The deceleration mechanism 20 is disposed between the first segment body 14a and the second segment body 14b. As illustrated in FIG. 3, the deceleration mechanism 20 has an intermediate axis 25, a first gear 26 secured to the rotation drive axis 24 of the motor 17, a second gear 27 secured to the intermediate axis 25 and engaged with the first gear 26, a third gear 28 secured to the intermediate axis 25, and a fourth gear 29 secured to the throttle shaft 15 and engaged with the third gear 28. The intermediate axis 25 is disposed to be parallel to the rotation drive axis 24 and the throttle shaft 15 and is rotatably supported by the unit body 23.

The deceleration mechanism 20 transmits the rotation of the rotation drive axis 24 of the motor 17 to the first gear 26, the second gear 27, the intermediate axis 25, the third gear 28, and the fourth gear 29 in this order to decelerate the rotation and drives and rotates the throttle shaft 15.

The return spring 21 is a cylindrical torsion spring disposed to be wound around the throttle shaft 15 several times and including one end portion supported by the unit body 23 and the other end portion supported by the throttle shaft 15. The return spring 21 biases the throttle shaft 15 to bring the throttle valves 16c and 16d into the closed state (first predetermined degree of opening).

The throttle position sensor 22 is provided at the one end portion of the throttle shaft 15 and functions to detect the rotational angle of the throttle shaft 15. The throttle position sensor 22 is disposed in the first segment body 14a, for example.

Next, an installation structure of the return spring 21 in the deceleration mechanism 20 according to the first embodiment will be described using FIGS. 4 to 6.

FIG. 4 is an assembly diagram of the attachment portion of the return spring 21 in the second throttle unit 12 according to the first embodiment. FIG. 5 is an explanatory diagram illustrating an installation state of the return spring 21 in the first throttle unit 11 according to the first embodiment. FIG. 6 is an explanatory diagram illustrating an installation state of the return spring 21 in the second throttle unit 12 according to the first embodiment. Note that the up-down direction in FIG. 4 is the opposite of that in FIGS. 1 to 3, 5, and 6 for easiness of viewing the attachment portion of the return spring 21 and the throttle shaft 15 is illustrated above a motor 17. Although the first throttle unit 11 and the second throttle unit 12 are symmetric on the left and right sides, the first throttle unit 11 and the second throttle unit 12 are illustrated in a right-side-left manner in FIG. 5 for easy comparison therebetween.

As illustrated in FIG. 4, a cylindrical rib 52 projecting outward in an axial line direction of an insertion hole 51 is formed around the insertion hole 51, into which the throttle shaft 15 is inserted, at an end portion of the unit body 23 (specifically, an end portion of the second segment body 14b on the side of the deceleration mechanism 20). Also, two projections (a first projection 53a and a second projection 53b) are formed outside the rib 52 in the radial direction, at the end portion of the second segment body 14b. The first projection 53a (first support portion) and the second projection 53b (second support portion) have columnar shape with diameters of about several mm, project outward in the axial line direction of the insertion hole 51 in parallel with the rib 52, and project up to the vicinity of the distal end of the rib 52. The first projection 53a and the second projection 53b are disposed at mutually opposite positions with the insertion hole 51 sandwiched therebetween, for example, at an interval from each other in the circumferential direction on a concentric circle around the insertion hole 51 at the center.

The return spring 21 has both end portions 21a and 21b, each of which extends outward in the radial direction. The return spring 21 is disposed such that the distal end portion of the rib 52 is inserted thereinto and is configured such that the end portion 21a on the side of the second segment body 14b can be locked at the first projection 53a and the second projection 53b.

The fourth gear 29 and the throttle shaft 15 are secured to each other via a disk-shaped hook plate 55 (shaft secured member). A shaft coupling hole 55a into which the throttle shaft 15 is inserted is provided at the center of the hook plate 55. The shaft coupling hole 55a and the distal end portion of the throttle shaft 15 are formed into rectangular shapes, for example, and the throttle shaft 15 and the hook plate 55 are coupled to each other such that rotation cannot be performed, that is, such that rotation of the fourth gear 29 is transmitted to the throttle shaft 15.

A flange portion 15a positioning the hook plate 55 in the axial direction is provided at the distal end portion of the throttle shaft 15. The return spring 21 is disposed between the hook plate 55 disposed with the distal end portion of the throttle shaft 15 inserted thereinto and the second segment body 14b. The fourth gear 29 is secured outside the hook plate 55 with a plurality of bolts, for example.

A first hook 55b (second support portion) extending outward in the radial direction and including a distal end bent in an axial direction (on the side of the second segment body 14b) and a stopper 55c are formed at an outer peripheral end portion of the hook plate 55.

A groove, for example, is formed in the first hook 55b such that the end portion 21b of the return spring 21 on the side of the fourth gear 29 on the side opposite to the second segment body 14b is easily locked.

The stopper 55c abuts on a stopper bolt 56 provided in the second segment body 14b and prevents rotation of the throttle shaft 15 in one direction (right rotation in FIG. 4).

The stopper bolt 56 is adapted such that the abutting position thereof with the stopper 55c can be adjusted.

The return spring 21 biases the hook plate 55 in one rotation direction (right rotation in FIG. 4) relative to the second segment body 14b, and the rotation is prevented at a predetermined rotation position by the stopper 55c. In other words, the throttle shaft 15 is biased to rotate relative to the unit body 23 due to a biasing force of the return spring 21. In this manner, the throttle valves 16c and 16d (16a and 16b in the first throttle unit 11) are closed when the motor 17 does not operate.

Also, the fourth gear 29 rotates (left rotation in FIG. 4) against the biasing caused by the return spring 21 via the deceleration mechanism 20 by causing the motor 17 to operate.

In the deceleration mechanism 20 according to this embodiment, the projections 53a and 53b are provided at two locations in the second segment body 14b, and the end portion 21a of the return spring 21 on the side of the second segment body 14b can be selectively locked at any one of these projections 53a and 53b. The throttle valves 16c and 16d (16a and 16b) are biased in a closed direction due to the biasing caused by the return spring 21, and the throttle valves 16c and 16d (16a and 16b) are brought into the closed state when the motor 17 does not operate. A biasing torque caused by the return spring 21 in the closed state, that is, a set torque for maintaining the throttle valves 16c and 16d (16a and 16b) in the closed state is defined by the locking position of the end portion 21a of the return spring 21.

Figure 5:
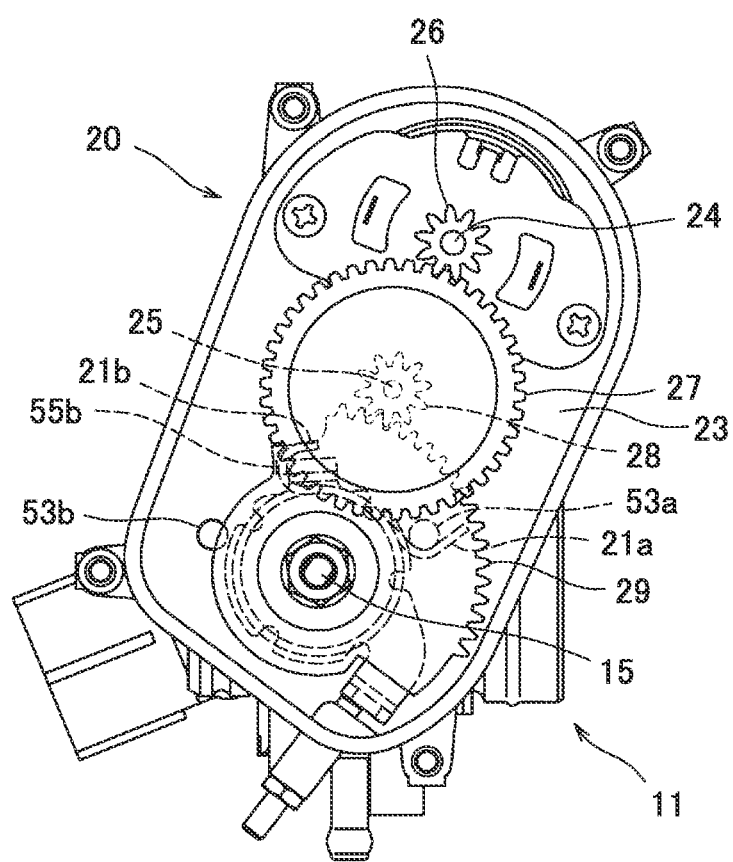
FIG. 5 is an explanatory diagram illustrating an installation state of the return spring in a first throttle unit according to the first embodiment.

As illustrated in FIG. 5, the set torque is set to be relatively small by locking the end portion 21a of the return spring 21 at the first projection 53a in the first throttle unit 11.

Figure 6:
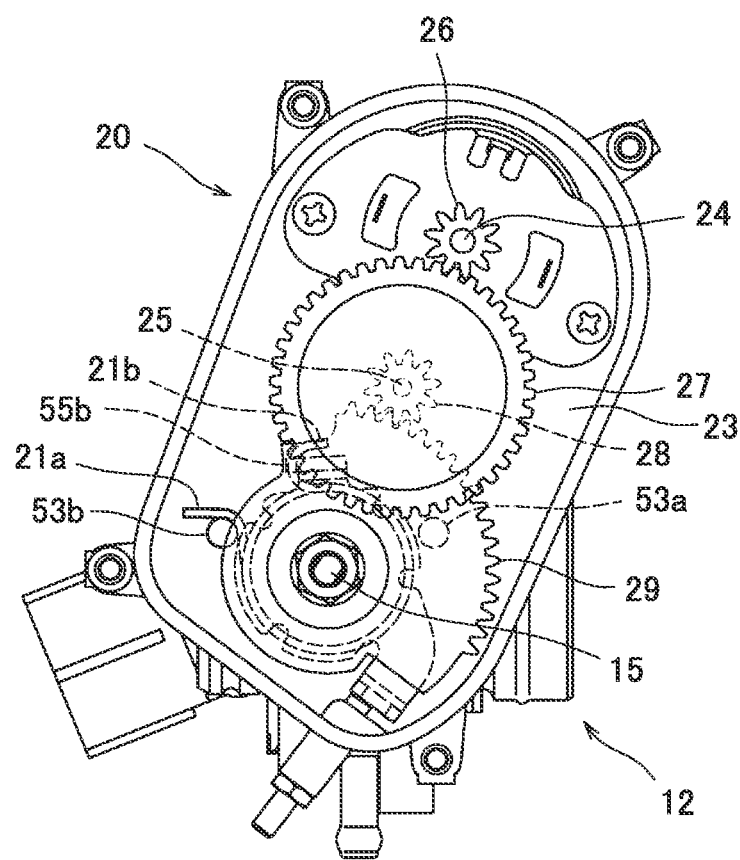
FIG. 6 is an explanatory diagram illustrating an installation state of the return spring in a second throttle unit according to the first embodiment.

As illustrated in FIG. 6, the set torque is set to be relatively large by locking the end portion 21a of the return spring 21 at the second projection 53b in the second throttle unit 12.

As illustrated in FIG. 1, the second segment bodies 14b of the first throttle unit 11 and the second throttle unit 12 are disposed inward in the left-right direction, that is, the motor 17 of the first throttle unit 11 and the motor 17 of the second throttle unit 12 are disposed inward in the left-right direction, and the throttle position sensor 22 is disposed outward in the left-right direction, in the throttle device 10.

Also, the first throttle unit 11 includes fuel injection valves 30a and 30b injecting a fuel into the intake air passages 13a and 13b. The second throttle unit 12 includes fuel injection valves 30c and 30d injecting a fuel into the intake air passages 13a and 13b. In other words, the throttle device 10 includes a total of four fuel injection valves 30a to 30d corresponding to the cylinders 2a to 2d.

The fuel is supplied from a fuel pump, which is not illustrated, to the two fuel injection valves 30a and 30b included in the first throttle unit 11 via a fuel pipe 31. Also, the fuel is supplied from a fuel pump, which is not illustrated, to the two fuel injection valves 30c and 30d included in the second throttle unit 12 via a fuel pipe 32.

Figure 7:
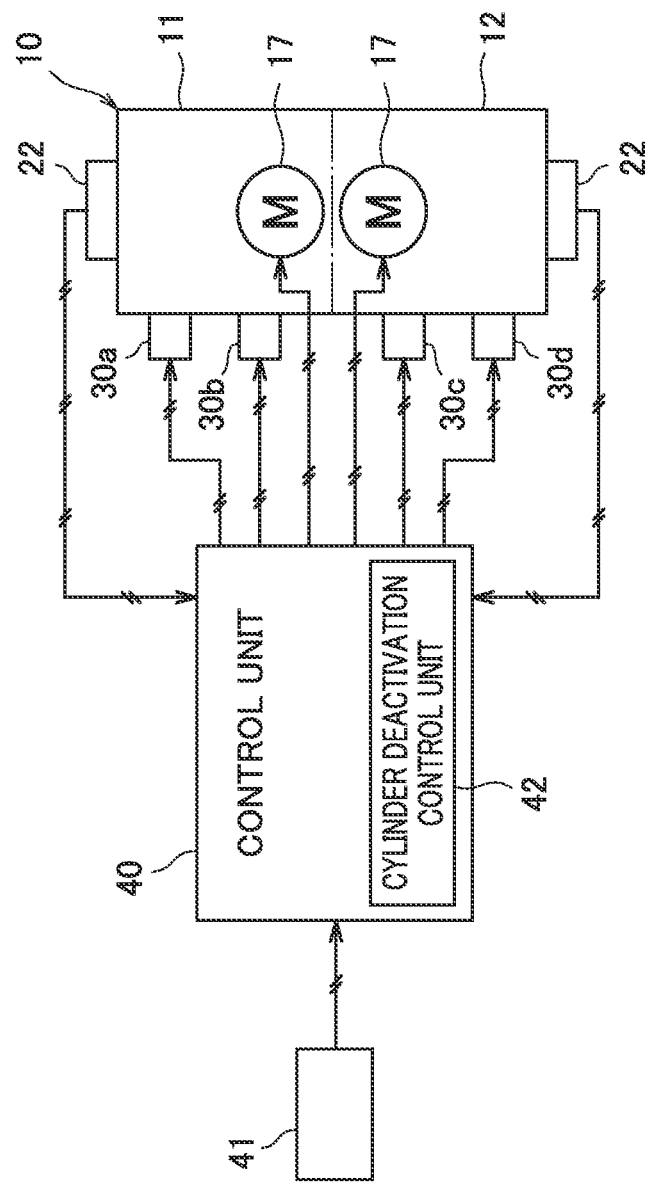
FIG. 7 is an electric circuit diagram for driving the throttle device.

FIG. 7 is an electric circuit diagram for driving the throttle device 10.

Driving of each of the motor 17 of the first throttle unit 11 and the motor 17 of the second throttle unit 12 in the throttle device 10 is controlled by the control unit 40.

The control unit 40 is a control device for controlling operations of the engine 1 and is configured to include an input/output device, a storage device (such as a ROM, a RAM, or a nonvolatile RAM), a central processing unit (CPU), and the like. The control unit 40 inputs a degree of opening of an accelerator detected by accelerator opening degree sensor 41 provided in the vehicle, applies a predetermined voltage of the motor 17 of the first throttle unit 11 and the motor 17 of the second throttle unit 12, outputs a drive current, controls driving of each motor 17, and controls operations of each of the fuel injection valves 30a to 30d. At this time, the rotational angle of the throttle shaft 15 detected by the throttle position sensor 22 is input for each of the first throttle unit 11 and the second throttle unit 12, and feedback control is performed such that the rotational angle of the throttle shaft 15 is obtained in accordance with the degree of accelerator opening.

In addition, the control unit 40 includes a cylinder deactivation control unit 42 executing a cylinder deactivated operation.

The cylinder deactivation control unit 42 controls driving of the motor 17 of the second throttle unit 12 such that the throttle valves 16c and 16d are in a fully opened state (second predetermined degree of opening) and stops injection of the fuel performed by the fuel injection valves 30c and 30d in a predetermined operating region of the engine 1, for example, at the time of a request for a low output to obtain a degree of accelerator opening of equal to or less than a predetermined value. Note that the operations of the motor 17 of the first throttle unit 11 and the fuel injection valves 30a and 30b are controlled in accordance with a requested output based on an accelerator operation or the like even in the predetermined operating region.

In this manner, the combustion in the two #3 and #4 cylinders 2c and 2d from among the four #1 to #4 cylinders 2a to 2d in the engine 1 is stopped. Thus, since fuel consumption at the #3 and #4 cylinders 2c and 2d becomes zero, and the throttle valves 16c and 16d are brought into the fully opened state in the #3 and #4 cylinders 2c and 2d, it is possible to reduce a pumping loss and to curb fuel consumption in the entire engine 1.

Further, the set torque of the return spring 21 in the second throttle unit 12 for the #3 and #4 cylinders 2c and 2d that are subjected to cylinder deactivation is set to be larger than the set torque of the return spring 21 in the first throttle unit 11 for the #1 and #2 cylinders 2a and 2b that are not subjected to the cylinder deactivation, in this embodiment.

Thus, it is possible to cause the throttle valves 16c and 16d in the second throttle unit 12 that are subjected to the cylinder deactivation to more quickly perform a closing operation than the throttle valves 16a and 16b in the first throttle unit 11 that are not subjected to the cylinder deactivation when operations of the throttle valve 16a to 16d in the first throttle unit 11 and the second throttle unit from the fully opened state to a fully closed state are caused.

Figure 8:
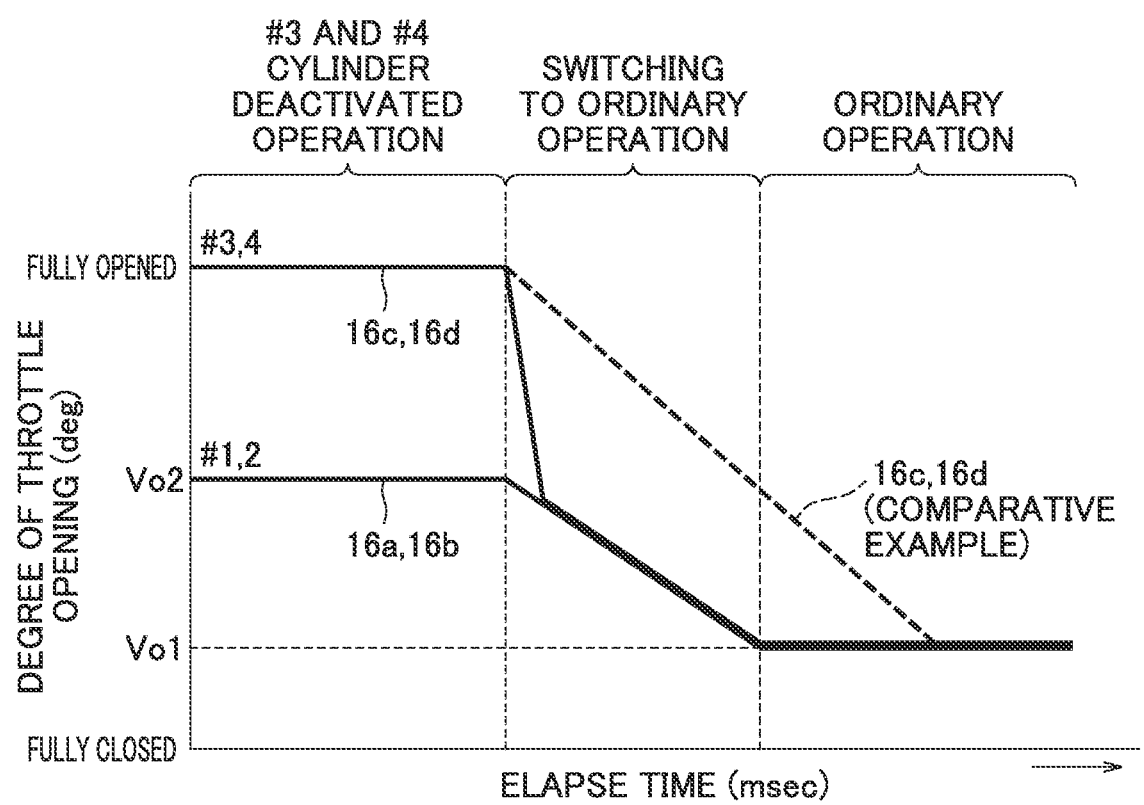
FIG. 8 is a graph illustrating a transition example of a degree of throttle opening at the time of shifting from a cylinder deactivated operation to an ordinary operation.

FIG. 8 is a graph illustrating a transition example of a degree of throttle opening at the time of transition from the cylinder deactivated operation to the ordinary operation. FIG. 8 illustrates transition of the degrees of opening of the throttle valves 16a, 16b, 16c, and 16d until the degrees of opening of the throttle valves 16a, 16b, 16c, and 16d transition to a predetermined degree of opening Vo1 when the cylinder deactivated operation is released from the cylinder deactivated operation state and transition to the ordinary operation is achieved. Note that FIG. 8 illustrates a case in which a requested output of the engine slightly increases from the cylinder deactivated operation state and transitions to the ordinary operation in which combustion is carried out in all the cylinders 2a to 2d is achieved. Note that in order to avoid large variation in the output of the entire engine 1, when the requested output of the engine 1 slightly increases from the cylinder deactivated operation state and switching to the ordinary operation is achieved, the degree of opening (predetermined degree of opening Vo2) of the throttle valves 16a and 16b in the cylinder deactivated operation state is greater than the degree of opening (predetermined degree of opening Vo1) of the throttle valves 16a, 16b, 16c, and 16d in the ordinary operation.

As illustrated in FIG. 8, the degree of opening of the throttle valves 16a and 16b in the first throttle unit 11 is the degree of throttle opening Vo2 corresponding to the requested output based on an accelerator operation or the like while the degree of opening of the throttle valves 16b and 16d in the second throttle unit 12 is a fully opened state. Also, in a case in which an operation of opening the accelerator is performed, a requested output increases, and the cylinder deactivated operation is released, for example, each motor 17 is controlled to achieve the ordinary operation in which all the throttle valves 16a to 16d have the requested degree of opening Vo1 based on the accelerator operation or the like.

Here, in a case in which installation forms of the return springs 21 in the first throttle unit 11 and the second throttle unit 12 are set to be the same in a comparative example, for example, in a case in which the set torque of the return spring 21 in the second throttle unit 12 is set to be the same as the set torque of the return spring 21 in the first throttle unit 11, the degree of opening of the throttle valves 16c and 16d in the second throttle unit 12 and the degree of opening (represented by the thin solid line in FIG. 8) of the throttle valves 16a and 16b in the first throttle unit 11 transition at equivalent speeds as represented by the dashed line in FIG. 8. Thus, a period of time during which the degree of opening of the throttle valves 16c and 16d does not reach the predetermined degree of opening Vo1 occurs even when the degree of opening of the throttle valves 16a and 16b reaches the predetermined degree of opening Vo1. Thus, there is a possibility that the degrees of opening of the throttle valves 16a and 16b and of the throttle valves 16c and 16d do not conform to each other over the entire period of time of the switching from the cylinder deactivated operation to the ordinary operation and immediately after the transition from the cylinder deactivated operation to the ordinary operation and the driver has an uncomfortable feeling from the output of the engine 1 due to a difference in output of the #1 and #2 cylinders 2a and 2b and the #3 and #4 cylinders 2c and 2d.

On the other hand, since the set torque of the return spring 21 in the second throttle unit 12 is larger than the set torque of the return spring 21 in the first throttle unit 11 in this embodiment, the degree of opening of the throttle valves 16c and 16d conforms to the degree of opening of the throttle valves 16a and 16b before the degree of opening of the throttle valves 16a and 16b in the first throttle unit 11 reaches the predetermined degree of opening Vo1 as represented by the thick solid line in FIG. 8. Note that each motor 17 may be controlled such that the transition is carried out with the degree of opening of the throttle valves 16c and 16d and the degree of opening of the throttle valves 16a and 16b maintained to conform to each other, until the predetermined degree of opening Vo1 is reached after the degree of opening of the throttle valves 16c and 16d and the degree of opening of the throttle valves 16a and 16b conform to each other.

Since the degree of opening of the throttle valves 16a and 16b in the first throttle unit 11 thus conforms to the degree of opening of the throttle valves 16c and 16d in the second throttle unit 12 in an early stage when the transition from the cylinder deactivated operation to the ordinary operation is achieved in this embodiment, it is possible to quickly cause the outputs of the #1 and #2 cylinders 2a and 2b to conform to the outputs of the #3 and #4 cylinders 2c and 2d, to smooth the output of the engine 1, and thereby to improve an output feeling.

Next, an installation structure of a return spring 21 in a deceleration mechanism 70 (decelerator) according to a second embodiment will be described using FIGS. 9 to 11.

Figure 9:
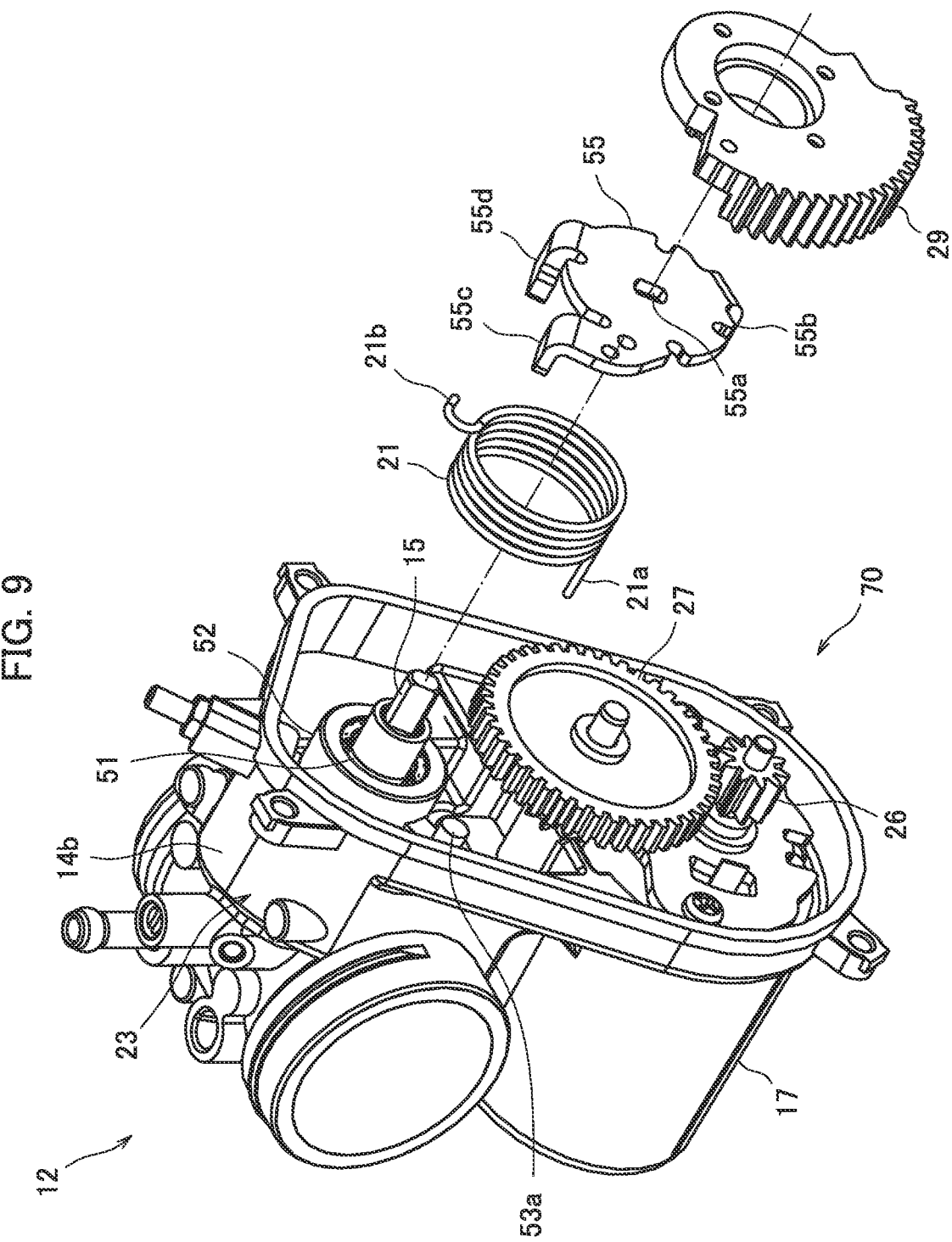
FIG. 9 is an assembly diagram of an attachment portion of a return spring according to a second embodiment.

FIG. 9 is an assembly diagram of an attachment portion of the return spring 21 in a second throttle unit 12 according to the second embodiment. FIG. 10 is an explanatory diagram illustrating an installation state of the return spring 21 in a first throttle unit 11 according to the second embodiment. FIG. 11 is an explanatory diagram illustrating an installation state of the return spring 21 in the second throttle unit 12 according to the second embodiment. Note that the up-down direction in FIG. 9 is the opposite of that in FIGS. 1 to 3, 10, and 11 for easiness of viewing an attachment portion of the return spring 21 and a throttle shaft 15 is illustrated above a motor 17. Also, the first throttle unit 11 and the second throttle unit 12 are illustrated in a right-side-left manner in FIG. 10 for easy comparison therebetween.

Hereinafter, points that are different from those in the first embodiment will be described.

Although the first embodiment employs the structure in which the locking position of the end portion 21a of the return spring 21 relative to the unit body 23 can be changed as described above, a locking position of an end portion 21b of the return spring 21 relative to a hook plate 55 secured to a fourth gear 29 can be changed in the second embodiment.

As illustrated in FIG. 9, the hook plate 55 according to the second embodiment is provided with a first hook 55b and a second hook 55d (second support portion) at which the end portion 21b of the return spring 21 is locked. The first hook 55b and the second hook 55d are disposed at an interval from each other in the circumferential direction on a concentric circle around a shaft coupling hole 55a at the center. Also, grooves, for example, are formed in both the first hook 55b and the second hook 55d for easy locking of the end portion 21b of the return spring 21.

It is thus possible to change the set torque depending on which of the first hook 55b and the second hook 55d of the hook plate 55 the end portion 21b of the return spring 21 is to be locked at, in the second embodiment.

Figure 10:
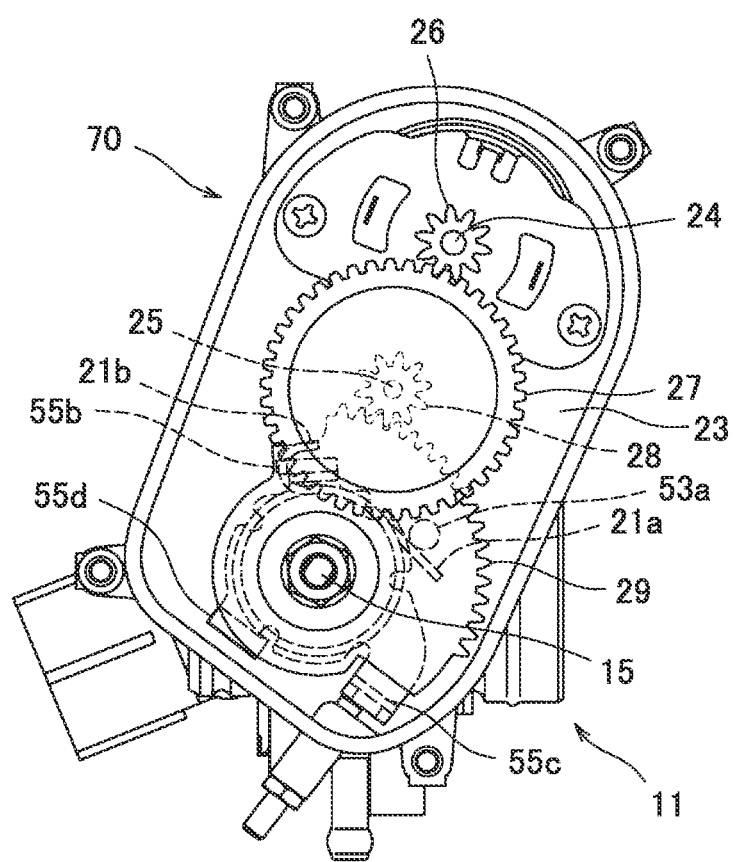
FIG. 10 is an explanatory diagram illustrating an installation state of the return spring in a first throttle unit according to the second embodiment.

As illustrated in FIG. 10, the set torque is set to be relatively small by locking the end portion 21b of the return spring 21 at the first hook 55b in the first throttle unit 11.

Figure 11:
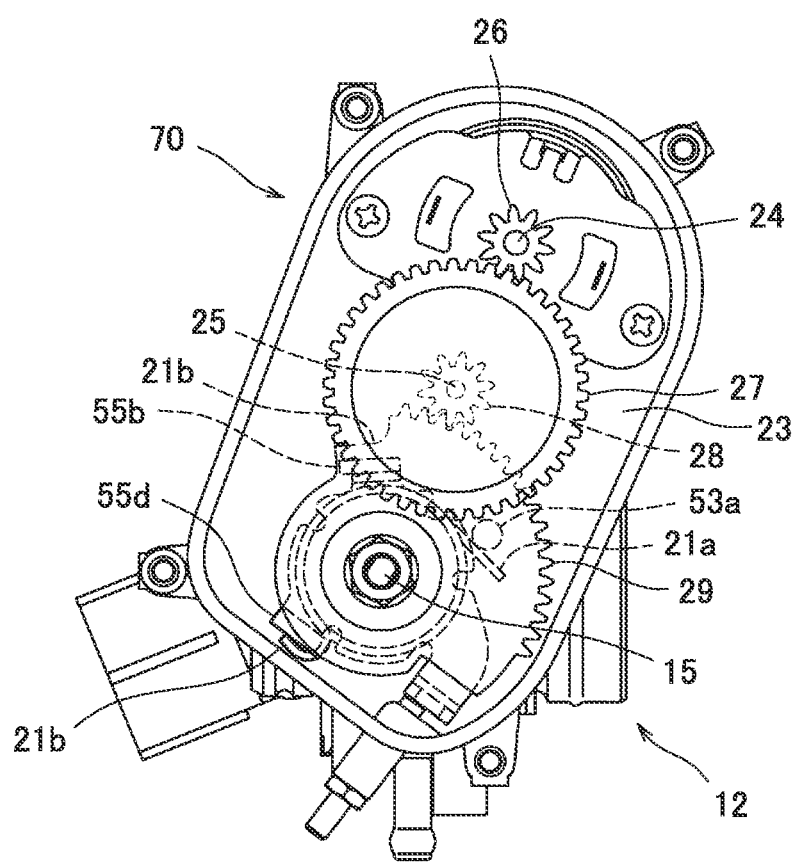
FIG. 11 is an explanatory diagram illustrating an installation state of the return spring in a second throttle unit according to the second embodiment.

As illustrated in FIG. 11, the set torque is set to be relatively large by locking the end portion 21b of the return spring 21 at the second hook 55d in the second throttle unit 12.

It is thus possible to easily change the set torque of the return spring 21 in the second embodiment similarly to the first embodiment. Since the set torque of the first throttle unit 11 that is not subjected to the cylinder deactivation is set to be relatively small, and the set torque of the second throttle unit 12 that is not subjected to the cylinder deactivation is set to be relatively large, it is possible to cause the degree of opening of the throttle valves 16a and 16b in the first throttle unit 11 to conform to the degree of opening of the throttle valves 16c and 16d in the second throttle unit 12 in an early stage, to quickly causes the outputs of the cylinders 2a to 2d to conform to each other, to smooth an output of the engine 1, and thereby to improve an output feeling.

Next, an installation structure of a return spring 21 in a deceleration mechanism 80 (decelerator) according to a third embodiment will be described using FIGS. 12 to 14.

Figure 12:
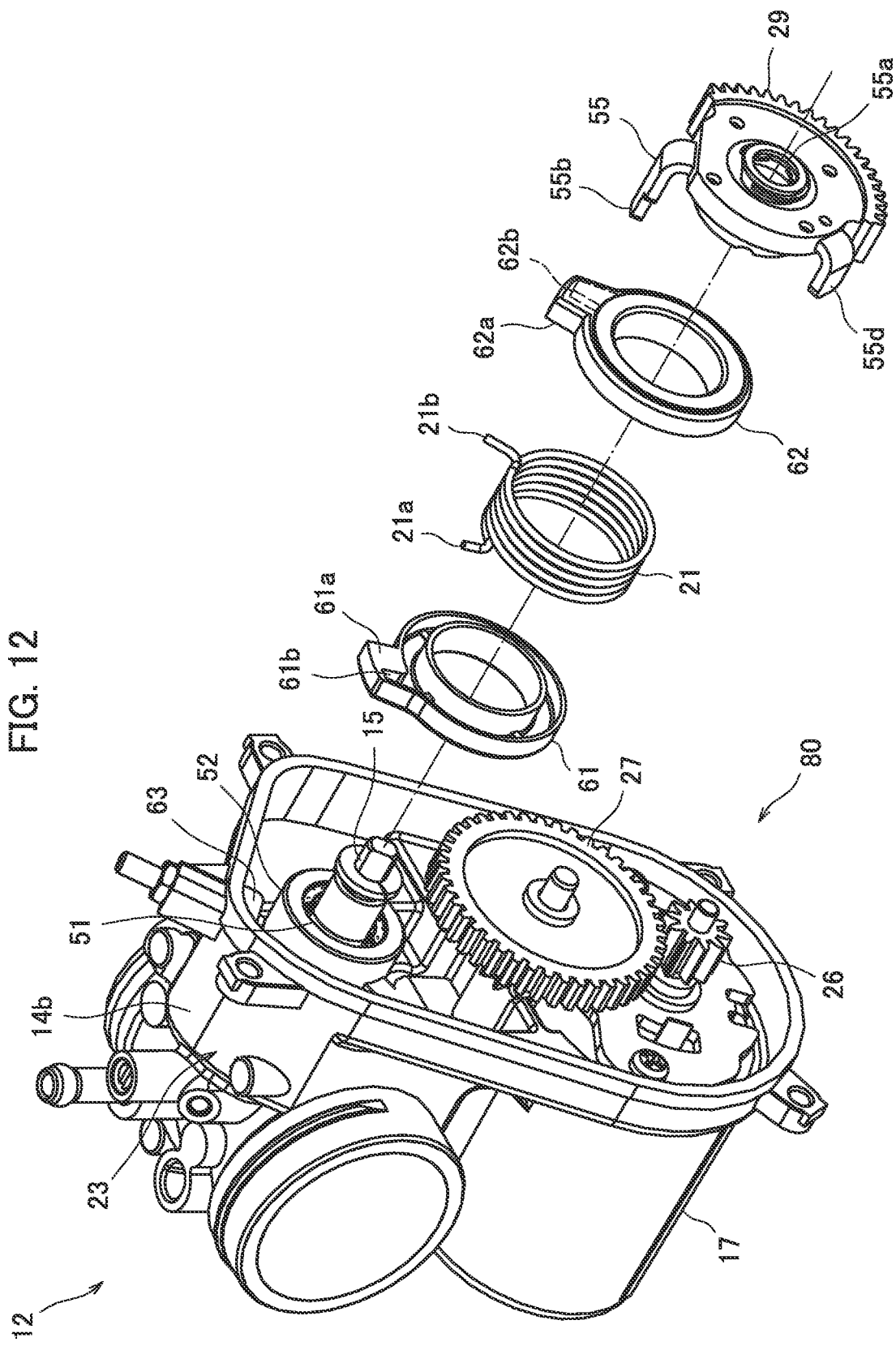
FIG. 12 is an assembly diagram of an attachment portion of a return spring according to a third embodiment.

FIG. 12 is an assembly diagram of an attachment portion of the return spring 21 in a second throttle unit 12 according to the third embodiment. FIG. 13 is an explanatory diagram illustrating an installation state of the return spring 21 in a first throttle unit 11 according to the third embodiment. FIG. 14 is an explanatory diagram illustrating an installation state of the return spring 21 in the second throttle unit 12 according to the third embodiment. Note that the up-down direction in FIG. 12 is the opposite of that in FIGS. 1 to 3, 13, and 14 for easiness of viewing the attachment portion of the return spring 21 and a throttle shaft 15 is illustrated above a motor 17. Also, the first throttle unit 11 and the second throttle unit 12 are illustrated in a right-side-left manner in FIG. 13 for easy comparison therebetween.

Hereinafter, points that are different from those in the first and second embodiments will be described.

As illustrated in FIG. 12, two annular tubular rings (a body-side ring 61 and a gear-side ring 62) are included between a second segment body 14b and a hook plate 55 with the return spring 21 sandwiched therebetween in the third embodiment.

The body-side ring 61 (first end portion support member) is disposed between the second segment body 14b and the return spring 21. The gear-side ring 62 (second end portion support member) is disposed between the hook plate 55 and the return spring 21. The body-side ring 61, the gear-side ring 62, and the return spring 21 are disposed to be rotatable about an axial line of a throttle shaft 15 relative to a rib 52 with the rib 52 inserted thereinto at the centers.

The body-side ring 61 and the gear-side ring 62 include projecting portions 61a and 62a with outer peripheral portions that partially project outward in the radial direction. The projecting portion 61a of the body-side ring 61 is provided with a groove 61b at which an end portion 21a of the return spring 21 on the side of the second segment body 14b is locked. The projecting portion 62a of the gear-side ring 62 is provided with a groove 62b at which an end portion 21b of the return spring 21 on the side of a fourth gear 29 is locked.

The hook plate 55 does not have a stopper 55c, and the first hook 55b and the second hook 55d are not provided with grooves at which the end portion 21b of the return spring 21 is locked.

The first hook 55b on one side is formed to extend in an axial direction between the projecting portion 62a of the gear-side ring 62 and the projecting portion 61a of the body-side ring 61. The return spring 21 biases the projecting portion 61a and the projecting portion 62a in a direction in which they approach one another with the first hook 55b sandwiched therebetween.

The unit body 23 is provided with a step difference 63 preventing rotation of the projecting portion 61a of the body-side ring 61 in the right direction in FIG. 4.

The throttle shaft 15 is biased by the return spring 21 to rotate relative to the unit body 23 (left rotation in FIG. 12) via the body-side ring 61, the gear-side ring 62, and the hook plate 55. In this manner, throttle valves 16c and 16d (16a and 16b) are closed and stopped when the motor 17 does not operate.

The first hook 55b rotates the projecting portion 62a (right rotation in FIG. 12) against the biasing of the return spring 21 by operating the motor 17 to rotate the fourth gear 29 in the right direction in FIG. 12.

Note that the rotational direction of the throttle shaft 15 for opening and closing the throttle valves 16c and 16d (16a and 16b) and the biasing direction of the return spring 21, and the rotation direction at the time of the driving of the motor 17 in the third embodiment are the opposite of those in the first and second embodiments.

In this embodiment, the body-side ring 61 and the gear-side ring 62 are detachable, the projecting portions 61a and 62 with different thicknesses in the circumferential direction are prepared in advance, and the body-side ring 61 or the gear-side ring 62 with the projecting portions 61a and 62a with different thicknesses in the circumferential direction can easily be replaced.

Figure 13:
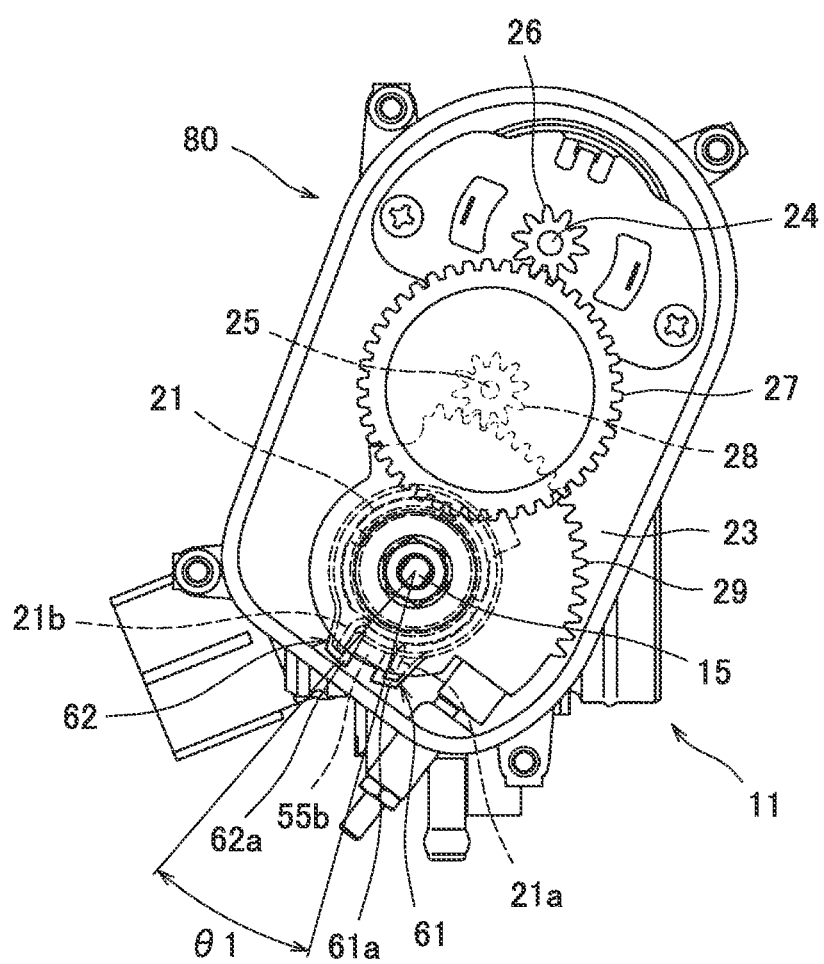
FIG. 13 is an explanatory diagram illustrating an installation state of the return spring in a first throttle unit according to the third embodiment.
Figure 14:
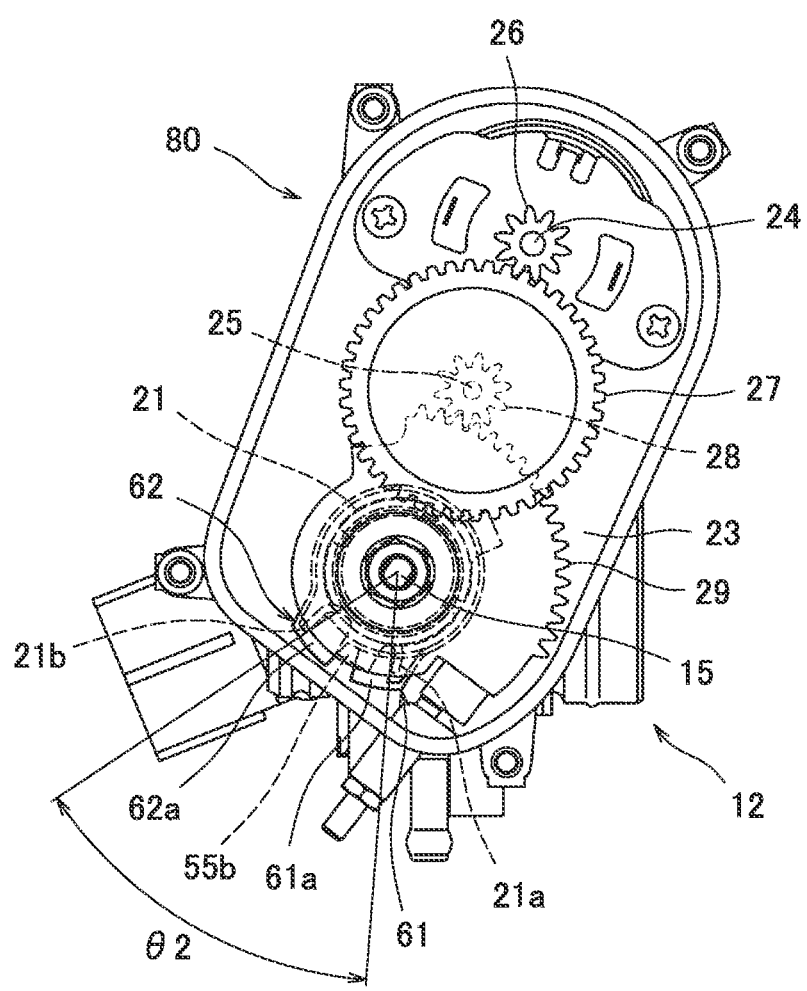
FIG. 14 is an explanatory diagram illustrating an installation state of the return spring in a second throttle unit according to the third embodiment.

As illustrated in FIGS. 13 and 14, the projecting portion 61a and the projecting portion 62a are positioned in a state in which the first hook 55b is sandwiched therebetween when the motor 17 does not operate, and the throttle valves 16c and 16d (16a and 16b) are brought into the closed state, by the projecting portion 61a and the projecting portion 62a being biased in the direction in which they approach one another by the return spring 21. The biasing torque of the return spring 21 at this time, that is, the set torque to maintain the throttle valves 16c and 16d (16a and 16b) in the closed state are defined by the angle between the end portion 21a of the return spring 21 on the side of the second segment body 14b and the end portion 21b on the side of the fourth gear 29.

As illustrated in FIG. 13, an angle θ1 between the end portion 21a and the end portion 21b of the return spring 21 when the motor 17 does not operate is relatively small, and the set torque is thus set to be relatively small, by using the body-side ring 61 with the projecting portion 61a with the thin thickness in the circumferential direction and the gear-side ring 62 with the projecting portion 62a with the thin thickness in the circumferential direction in the first throttle unit 11.

As illustrated in FIG. 14, an angle θ2 between the end portion 21a and the end portion 21b of the return spring 21 when the motor 17 does not operate is relatively large, and the set torque is thus set to be relatively large, by using the body-side ring 61 with the projecting portion 61a with the thick thickness in the circumferential direction and the gear-side ring 62 with the projecting portion 62a with the thick thickness in the circumferential direction in the second throttle unit 12.

It is thus possible to easily change the set torque in the third embodiment similarly to the first and second embodiments. Also, since the set torque of the first throttle unit 11 that is not subjected to the cylinder deactivation is set to be relatively small, and the set torque of the second throttle unit 12 that is not subjected to the cylinder deactivation is set to be relatively large, it is possible to cause the degree of opening of the throttle valves 16a and 16b in the first throttle unit 11 to conform to the degree of opening of the throttle valves 16c and 16d in the second throttle unit 12 in an early stage, to quickly cause the outputs of the cylinders 2a to 2d to conform to each other, to smooth the output of the engine 1, and thereby to improve an output feeling, when transition from the cylinder deactivated operation to the ordinary operation is carried out.

As described above, the throttle device 10 according to each of the first to third embodiments is the multi-throttle device 10 provided with the throttle valves 16a to 16d in the intake air passages 13a to 13d of the four cylinders 2a to 2d in the engine 1 and includes the two throttle units 11 and 12. The throttle device 10 has a structure in which the motor 17 included in the first throttle unit 11 drives the two throttle valves 16a and 16b while the motor 17 included in the second throttle unit 12 drives the two throttle valves 16a and 16b.

Also, the set torques of the return springs 21 differ from each other in the first throttle unit 11 and the second throttle unit 12, and the torques of the return springs 21 are thus set to be different from each other at the same degree of opening of the throttle valves 16a to 16d, in the first to the third embodiments.

In this manner, it is possible to cause the throttle valves 16a and 16b in the first throttle unit 11 and the throttle valves 16c and 16d in the second throttle unit 12 to have different responsiveness to valve opening degree control in which the throttles are operated from the fully opened state to the fully closed state, with a simple configuration by the first throttle unit 11 and the second throttle unit 12 having different torques of the return springs 21.

Further, the engine 1 according to each of the first to third embodiments include the cylinder deactivated operation function and changes the degree of opening of the throttle valve 16b in the second throttle unit 12 corresponding to a part of the four cylinders 2a to 2d, namely the cylinders 2c and 2d into a fully opened state at the time of a low requested output.

Since the biasing torque of the return spring 21 in the second throttle unit 12 that are operated in the fully opened state in the cylinder deactivated operation function is set to be larger than the biasing torque of the return spring 21 in the first throttle unit 11 in which the cylinder deactivation is not performed in the cylinder deactivated operation to obtain a specification that the return spring 21 in the second throttle unit 12 has a higher responding performance in the first to third embodiments, it is possible to curb an uncomfortable feeling of the output of the engine 1 with a simple configuration by quickly lowering the degree of opening of the throttle valves 16c and 16d in the second throttle unit 12 to the same degree of opening as that of the throttle valves 16a and 16b in the first throttle unit 11 when the cylinder deactivated operation is released. According to the embodiments, it is possible to easily change the set torques and to share the return springs 21 and other components since the installation forms of the return springs 21 of the same type are different from each other in the first throttle unit 11 and the second throttle unit 12.

In the aforementioned first to third embodiments, the deceleration ratio of the deceleration mechanism 20 in the first throttle unit 11 and the deceleration ratio of the deceleration mechanism 20 in the second throttle unit 12 may further be set to different deceleration ratios.

Figure 15:
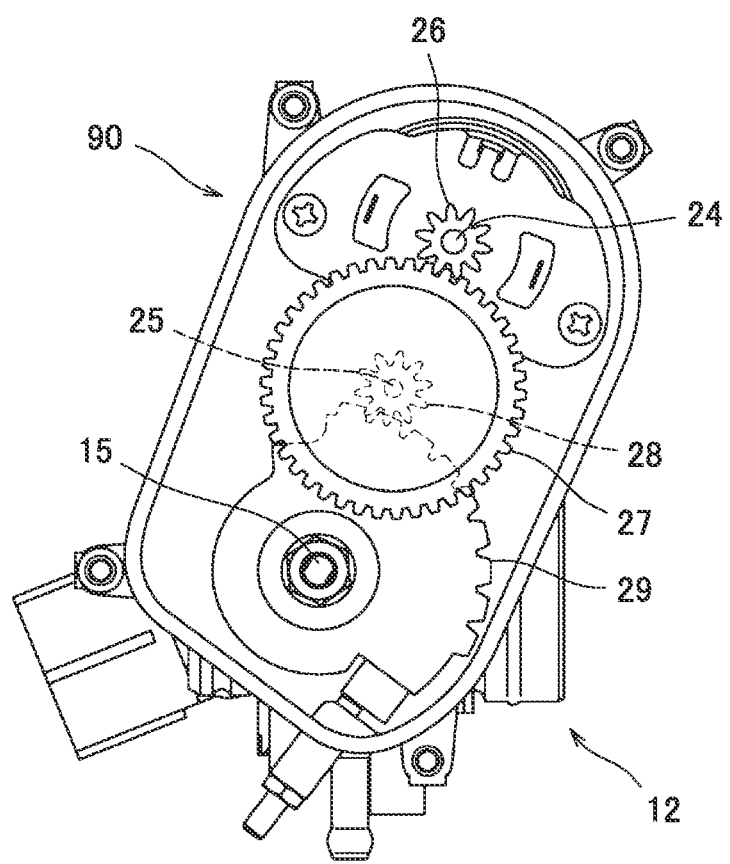
FIG. 15 is an internal structure diagram of a deceleration mechanism according to another embodiment.

FIG. 15 is a structure diagram of a deceleration mechanism 90 (decelerator) according to another embodiment in the second throttle unit 12.

For example, the gear ratio of the third gear 28 and the fourth gear 29 in the deceleration mechanism 20, 70, or 80 in the second throttle unit 12 used for the cylinder deactivated operation function may be set lower than the gear ratio in the deceleration mechanism 20, 70, or 80 in the first throttle unit 11, which is set to a gear ratio similar to that of the deceleration mechanism 20 illustrated in FIG. 3, as illustrated in FIG. 15 in the aforementioned first to third embodiments. Note that the gear ratio of the first gear 26 and the second gear 27 may be set to be low instead of or along with that of the third gear 28 and the fourth gear 29.

In this manner, it is possible to set the rotation speed of the throttle shaft 15 in the second throttle unit 12 to be higher than the rotation speed of the throttle shaft 15 in the first throttle unit 11.

In this manner, it is possible to change the opening/closing speeds of the throttle valves 16a to 16d by setting different deceleration ratios of the deceleration mechanisms 20 and 90 in the first throttle unit 11 and the second throttle unit 12 and thereby to further significantly change the responding performance.

The motor 17 of the first throttle unit 11 and the motor 17 of the second throttle unit 12 may have different responding performances. The responding performances of the motors 17 can be changed depending on the wire diameters and the numbers of windings of coils.

A specification with a higher performance of responding to a change in rotation speed is obtained for the motor 17 of the second throttle unit 12 for the #3 and #4 cylinders 2c and 2d that are subjected to the cylinder deactivation than for the motor 17 of the first throttle unit 11 for the #1 and #2 cylinders 2a and 2b that are not subjected to the cylinder deactivation. Since a coil resistance is reduced by increasing the wire diameter of the coil of the motor 17 or reducing the number of windings of the coil, for example, it is possible to cause a large current to flow through the coil and thereby to improve the responding performance. Also, the control unit 40 may set a current supplied to the motor 17 of the second throttle unit 12 to be larger than a current supplied to the motor 17 of the first throttle unit 11. In this manner, it is possible to further enhance the responding performance of the motor 17 of the second throttle unit 12 as compared with the motor 17 of the first throttle unit 11 and to further quickly cause the degrees of opening of the throttle valves 16a and 16b and the throttle valves 16c and 16d to conform to each other immediately after the transition from the cylinder deactivated operation to the ordinary operation.

Although the description of the embodiments will now end, the aspects of the present invention are not limited to the aforementioned embodiments. For example, although the present invention is applied to the engine 1 provided with the cylinder deactivated operation function in the aforementioned embodiments, the present invention may be applied to an engine with no cylinder deactivated operation function.

It is possible to immediately solve differences in degrees of opening of a plurality of throttle valves in a case in which control is performed to obtain the same degree of opening from the state in which the degrees of opening differ from each other, in an engine in which a state where the degrees of opening of the plurality of throttle valves differ from each other may occur regardless of the engine being not provided with the cylinder deactivated operation function. It is thus possible to achieve smooth operations of the engine with a simple configuration.

Although the present invention is applied to the throttle device 10 in the four-cylinder engine 1 in the embodiments, the present invention may be applied to a throttle device for an engine with a plurality of cylinders instead of the four-cylinder engine.

Although the throttle device 10 according to the embodiment has the two throttle units 11 and 12, and the total of two motors 17 for each two of the four cylinders drive the throttle valves for the cylinders, the throttle device may include three or more throttle units and motors. The number of throttle valves operated by each motor may be any number instead of two.

The throttle device according to the present invention can be employed for an engine used for applications other than the motorcycle.

Although the return springs 21 of the same type are used in the first throttle unit 11 and the second throttle unit 12 in the aforementioned embodiments, return springs made of different materials with different designs for each throttle unit may be used as long as the installation forms of the return springs 21 can be changed as in the embodiments. It is thus possible to widely apply the present invention to various engines.

The present invention is employed in a multi-cylinder engine and can widely be applied to a throttle device in which a plurality of motors share operations of opening and closing a plurality of throttle valves.

What is claimed is:

1. A throttle device comprising:
a plurality of throttle units provided in an engine for each of cylinders or for each of cylinder groups, each of the throttle units including
a throttle body having intake air passages corresponding to the plurality of cylinders of the engine,
a throttle shaft rotatably supported by the throttle body,
throttle valves secured to the throttle shaft to open and close the intake air passages of the cylinders,
a motor driving and rotating the throttle shaft, and
a biasing portion biasing the throttle shaft to cause the throttle valves to have a first predetermined degree of opening,
wherein the biasing portion is a torsion spring including one end portion supported by the throttle body and the other end portion supported by the throttle shaft and wound around the throttle shaft,
the throttle body includes a plurality of first support portions configured to support the one end portion of the biasing portion at mutually different positions in a circumferential direction of the throttle shaft, and
the one end portion of the biasing portion is selectively supported by any one of the plurality of first support portions,
whereby a biasing torque of the biasing portion provided in a first throttle unit and a biasing torque of the biasing portion provided in a second throttle unit out of the plurality of throttle units are different from each other at a same degree of opening of the throttle valves.

2. The throttle device according to claim 1,
wherein the biasing portion provided in the first throttle unit and the biasing portion provided in the second throttle unit are components of the same type.

3. The throttle device according to claim 1, further comprising:
a cylinder deactivation control unit stopping operations only of the motor of the second throttle unit out of the first throttle unit and the second throttle unit, in a predetermined operating region of the engine, setting the throttle valves of the second throttle unit to have a second predetermined degree of opening, and deactivating combustion of the cylinder or the cylinder group corresponding to the second throttle unit,
wherein the biasing torque of the biasing portion of the second throttle unit is larger than the biasing torque of the biasing portion of the first throttle unit at the same degree of opening of the throttle valves.

4. The throttle device according to claim 1,
wherein each of the first throttle unit and the second throttle unit is provided with a decelerator decelerating rotation of a drive shaft of the motor and transmitting the decelerated rotation to the throttle shaft, and
a deceleration ratio of the decelerator of the first throttle unit and a deceleration ratio of the decelerator of the second throttle unit are different from each other.

5. The throttle device according to claim 1, wherein the motor of the first throttle unit and the motor of the second throttle unit have mutually different performances of responding to a change in rotation speed.

6. The throttle device according to claim 1, wherein two units being the throttle units are provided in the engine.

7. The throttle device according to claim 1, wherein the throttle device is provided in the engine of a motorcycle.

8. A throttle device comprising:
a plurality of throttle units provided in an engine for each of cylinders or for each of cylinder groups, each of the throttle units including
a throttle body having intake air passages corresponding to the plurality of cylinders of the engine,
a throttle shaft rotatably supported by the throttle body,
throttle valves secured to the throttle shaft to open and close the intake air passages of the cylinders,
a motor driving and rotating the throttle shaft, and
a biasing portion biasing the throttle shaft to cause the throttle valves to have a first predetermined degree of opening,
wherein the biasing portion is a torsion spring including one end portion supported by the throttle body and the other end portion supported by the throttle shaft and wound around the throttle shaft,
the throttle shaft or a shaft secured member secured to the throttle shaft includes a plurality of second support portions configured to support the other end portion of the biasing portion at mutually different positions in a circumferential direction of the throttle shaft, and
the other end portion of the biasing portion is selectively supported by any one of the plurality of second support portions,
whereby a biasing torque of the biasing portion provided in a first throttle unit and a biasing torque of the biasing portion provided in a second throttle unit out of the plurality of throttle units are different from each other at a same degree of opening of the throttle valves.

9. The throttle device according to claim 8,
wherein the biasing portion provided in the first throttle unit and the biasing portion provided in the second throttle unit are components of the same type.

10. The throttle device according to claim 8, further comprising:
a cylinder deactivation control unit stopping operations only of the motor of the second throttle unit out of the first throttle unit and the second throttle unit, in a predetermined operating region of the engine, setting the throttle valves of the second throttle unit to have a second predetermined degree of opening, and deactivating combustion of the cylinder or the cylinder group corresponding to the second throttle unit,
wherein the biasing torque of the biasing portion of the second throttle unit is larger than the biasing torque of the biasing portion of the first throttle unit at the same degree of opening of the throttle valves.

11. The throttle device according to claim 8,
wherein each of the first throttle unit and the second throttle unit is provided with a decelerator decelerating rotation of a drive shaft of the motor and transmitting the decelerated rotation to the throttle shaft, and
a deceleration ratio of the decelerator of the first throttle unit and a deceleration ratio of the decelerator of the second throttle unit are different from each other.

12. The throttle device according to claim 8, wherein the motor of the first throttle unit and the motor of the second throttle unit have mutually different performances of responding to a change in rotation speed.

13. The throttle device according to claim 8, wherein two units being the throttle units are provided in the engine.

14. The throttle device according to claim 8, wherein the throttle device is provided in the engine of a motorcycle.

15. A throttle device comprising:
a plurality of throttle units provided in an engine for each of cylinders or for each of cylinder groups, each of the throttle units including
a throttle body having intake air passages corresponding to the plurality of cylinders of the engine,
a throttle shaft rotatably supported by the throttle body,
throttle valves secured to the throttle shaft to open and close the intake air passages of the cylinders,
a motor driving and rotating the throttle shaft,
a biasing portion biasing the throttle shaft to cause the throttle valves to have a first predetermined degree of opening;
a first end portion support member detachably supported by the throttle body; and
a second end portion support member detachably supported by the throttle shaft,
wherein the biasing portion is a torsion spring including one end portion supported by the first end portion support member and the other end portion supported by the second end portion support member and wound around the throttle shaft, and
at least either the first end portion support member or the second end portion support member is selected from a plurality of types thereof configured to support the end portion of the biasing portion at mutually different positions in a circumferential direction of the throttle shaft,
whereby a biasing torque of the biasing portion provided in a first throttle unit and a biasing torque of the biasing portion provided in a second throttle unit out of the plurality of throttle units are different from each other at a same degree of opening of the throttle valves.

16. The throttle device according to claim 15,
wherein the biasing portion provided in the first throttle unit and the biasing portion provided in the second throttle unit are components of the same type.

17. The throttle device according to claim 15, further comprising:
a cylinder deactivation control unit stopping operations only of the motor of the second throttle unit out of the first throttle unit and the second throttle unit, in a predetermined operating region of the engine, setting the throttle valves of the second throttle unit to have a second predetermined degree of opening, and deactivating combustion of the cylinder or the cylinder group corresponding to the second throttle unit,
wherein the biasing torque of the biasing portion of the second throttle unit is larger than the biasing torque of the biasing portion of the first throttle unit at the same degree of opening of the throttle valves.

18. The throttle device according to claim 15,
wherein each of the first throttle unit and the second throttle unit is provided with a decelerator decelerating rotation of a drive shaft of the motor and transmitting the decelerated rotation to the throttle shaft, and
a deceleration ratio of the decelerator of the first throttle unit and a deceleration ratio of the decelerator of the second throttle unit are different from each other.

19. The throttle device according to claim 15, wherein the motor of the first throttle unit and the motor of the second throttle unit have mutually different performances of responding to a change in rotation speed.

20. The throttle device according to claim 15, wherein two units being the throttle units are provided in the engine.

21. The throttle device according to claim 15, wherein the throttle device is provided in the engine of a motorcycle.

* * * * *